July 29, 1952  J. A. TALALAY  2,604,663
METHOD OF MAKING A CELLULAR RUBBER ARTICLE
Filed Jan. 6, 1950  2 SHEETS—SHEET 1
FIG. I
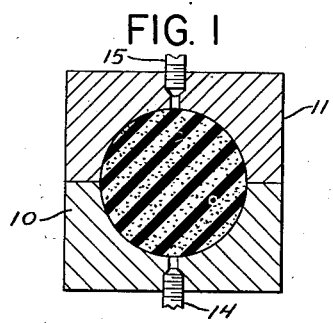
FIG. IA
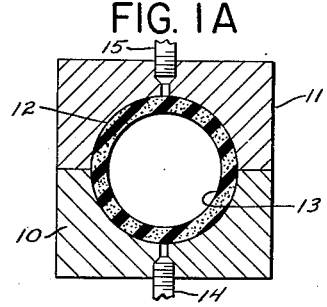
FIG. 2
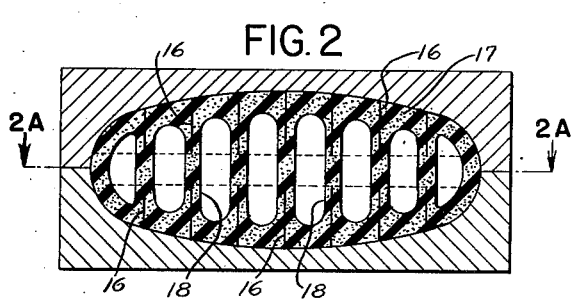
FIG. 2A
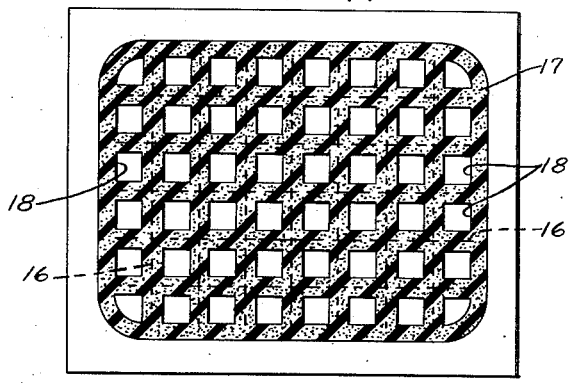
FIG. 3
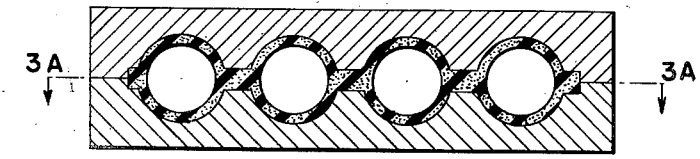
*INVENTOR.*
JOSEPH A. TALALAY
BY *Willard D. Eakin*
ATTORNEY

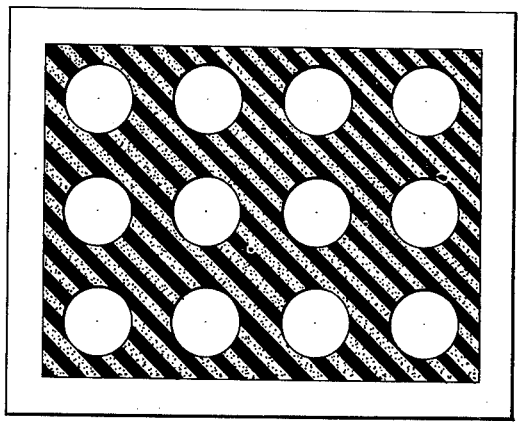
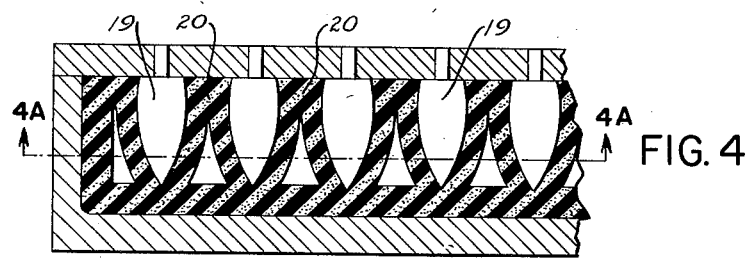
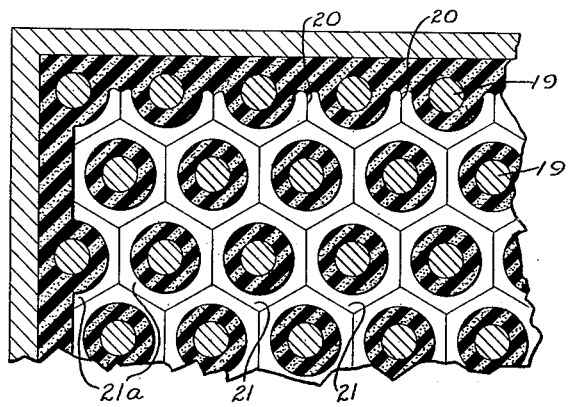
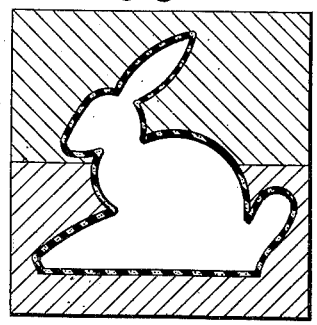
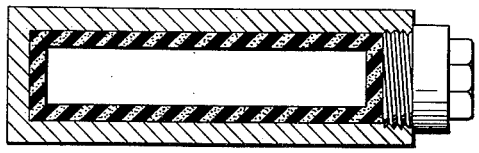

Patented July 29, 1952

2,604,663

UNITED STATES PATENT OFFICE 2,604,663

METHOD OF MAKING A CELLULAR RUBBER ARTICLE

Joseph Anton Talalay, New Haven, Conn.

Application January 6, 1950, Serial No. 137,221

8 Claims. (Cl. 18—53)

1

This invention relates to procedure for making cellular articles of natural or synthetic rubber or the like and to articles produced by such procedure, and especially procedure in which freezing of a foam, with or without the use of a coagulant, is used for temporarily or permanently stabilizing or coagulating the foam, as in Ogilby U. S. Patent No. 2,309,005, or in my U. S. Patent No. 2,432,353, in which I more broadly claim some of the steps of the present process.

Its chief objects are to provide an improved article having a wall of cellular material which defines an internal cavity or cavities completely surrounded by an integral wall of the cellular material; to provide improved procedures for making such an article, and more particularly for producing the cavity in the article without requiring a mold core for shaping the cavity; to provide in the article one or more of the cavities in desired predetermined shape and arrangement; to economize in the matter of heat exchange in the production of such articles; to provide a surface skin, permissibly impervious, on the exterior of the article; to provide a lining skin, permissibly impervious, for the cavity in the article; to provide for quick dissemination of a gaseous or other coagulant throughout the extent of the frozen and consequently stereoreticulate foam as contemplated in my above identified patent; to provide a high degree of softness or resilient deformability in an article of this type without the use of numerous cavity-forming cores; thus to economize in the amount of metal required in the molding equipment, and in the matter of expense of shaping metal parts; to produce a one-piece article having one or more of the cavities wholly enclosed within a continuous outer wall and having a desirable external contour; and to provide other advantages which will be manifest in the following description.

Of the accompanying drawings:

Fig. 1 is a vertical middle section of a two part mold representing an early stage of my process.

Fig. 1A is a like section but illustrating a later stage of the process.

Fig. 2 is a vertical middle section, of another type of mold illustrating a late stage of the process as applied to the making of a multi-cavitied pad.

Fig. 2A is a section on line 2A—2— of Fig. 2.

Fig. 3 is a middle vertical section, taken at a late stage of the process, of a mold adapted for forming a multi-cavitied mattress or sheet-like pad having the form of a field of hollow, cellular-walled balls connected by a medial cellular web.

Fig. 3A is a section on line 3A—3A of Fig. 3.

Fig. 4 is a fragmentary vertical section, taken at a late stage of the process, of a mold adapted to provide a cushion, mattress or the like having both core-formed cavities and cavities formed otherwise than by core shaping.

Fig. 4A is a section on line 4A—4A of Fig. 4, as viewed from below.

Fig. 5 is a section corresponding to Fig. 1A except that it illustrates the making of a contoured toy or animal figure instead of a ball.

Fig. 6 is a vertical middle section, at a late stage of the process, of an inexpensive mold adapted for making a hollow product having an internal cavity completely enclosed by an integral wall of the cellular material, permissibly ebonite, the article having the form of a tube with closed ends, suitable for use as a high buoyancy float.

Referring first to Figs. 1 and 1A, which illustrate the invention in a simple form, the mold, consisting of a lower section 10 and an upper section 11, is completely filled, as in Fig. 1, with an aqueous dispersion in the form of a closed-cell foam, which can be produced in any of the well known ways, such as by whipping, application of a vacuum, as in my U. S. Patent No. 2,140,062, or by the use of a "blowing" agent.

The filled mold is then subjected to a quick, extreme, and briefly maintained reduction of temperature, such that a spherical layer of foam 12, Fig. 2, is frozen without collapsing, and permissibly thereby permanently coagulated, as in Ogilby 2,309,005 above mentioned, without freezing of the rest of the foam, in the central region, and this central mass of foam then in time collapses, providing the central cavity 13, Fig. 2.

The thickness of the frozen layer can be well controlled by reason of the fact that the foamed dispersion has low heat conductivity.

In its collapsing, the small amount of liquid of which the collapsing foam is composed deposits itself, because of surface tensions, with approximate uniformity upon the inner face of the frozen shell of foam and thereby provides a relatively high density of foam at that surface, but permissibly without forming an impervious lining skin. Uniformity of its distribution can be improved, if desired, by turning the mold to various positions while the foam is collapsing.

In freezing, the foam shell 12 becomes stereo-reticulate, as in the freezing of foam in my Patent No. 2,432,353 above mentioned, and consequently, without freezing it to so low a temperature or for so long a time as to irreversibly coagulate it by reason of the freezing alone, its coagulation can be made irreversible, as in my said patent, by passing a suitable coagulant, such as carbon dioxide, through the stereoreticulate mass, the mold being provided, as shown, with an inlet pipe 14 and an outlet pipe 15.

The central cavity 13 provides for quick dissemination of the coagulant throughout the stereoreticulate frozen foam shell 12, when the inner surface of the shell is not made impervious by deposit of the liquid of the collapsing central mass of the foam.

When irreversible coagulation has been effected, either by the freezing alone or by the passing of a coagulant into or through the interstices of the reticulate frozen shell, the material, permissibly while still in the mold, is vulcanized, removed from the mold, and preferably is washed and dried.

In the case of articles so proportioned and so treated that central foam collapses in such large amount that the liquid of it collects by gravity at the bottom of the cavity, a lining skin for the cavity can be formed by turning the mold about to distribute the liquid over the cavity-defining surface.

An impervious outer skin for the ball or other article can be provided either by preliminary coating of the molding surfaces with the dispersion or other suitable liquid in unfoamed condition, or by spraying or otherwise coating the surface of the article with dispersion or other suitable liquid after it has been removed from the mold.

The collapsing of the central mass of foam, because of its consisting so largely of expansible gas, does not result in such change of volume or internal pressure as to modify substantially the shape or size of the finished article upon its removal from the mold, at atmospheric pressure, even when it has an impermeable outer skin.

The thickness of the wall of the cavity of course depends upon the time and temperature of the refrigeration.

Foam stabilizers and delayed-action coagulants, well known to those skilled in the art, can be used if desired.

The material of which the foam is formed can be a dispersion of any of the dispersible and vulcanizable or otherwise firmable or fixable rubberlike substances, all of which are intended to be included in the word rubber in the appended claims, as are also dispersions of reclaimed rubber and dispersions of compositions adapted to produce ebonite or the like.

In Figs. 2 and 2A each section of the mold is provided with a metal grid 16 on its molding face, the two grids being in registry and extending almost to each other when the mold is closed, but preferably not quite touching each other, so that there will be space between them for free flow of the foam in the filling of the mold or in the equalizing of density of the foam.

The metal walls or partitions that constitute the grid are adapted to conduct heat to effect quick refrigeration of the foam adjacent to them and thus to provide, as shown, a one-piece cushion 17 having, by reason of collapse of unfrozen parts of the foam, a multiplicity of wholly closed internal cavities 18, 18. The procedure with this mold, and with each of the other molds shown, corresponds to that above described with reference to the mold of Figs. 1 and 1A, and of course any of the molds shown in the drawings can be provided with inlet and outlet pipes, such as the pipes 14, 15 shown in Figs. 1 and 1A, for passing a coagulant or other fluid through the stereoreticulate frozen foam, with or without subatmospheric pressure being employed in the outlet pipe for effecting or hastening the flow.

Figs. 4 and 4A show a mold adapted for forming a cushion, mattress or the like having coreshaped cavities and cavities formed by collapse of foam, in predetermined relation and configuration, one of the mold sections being provided with a set of cores 19, 19 such as are described and claimed in my copending application Ser. No. 96,355, filed May 31, 1949. Where the cores are close together a permanent cellular wall may be formed which fills the space between them, as at 20, 20, but where their surfaces are farther apart the layers of frozen foam are not so thick as to fill all of the space between them, the time and degree of refrigeration being properly controled, and subsequent collapse of the unfrozen parts of the foam results in the formation of cavities 21, 21, each of which can be individually of closed form, according to the shape of the cores, or, as here shown, can be parts of a single large cavity 21$^a$, Fig. 4A, of geometric design as determined by the shape, size and arrangement of the cores 19.

The mold shown in Fig. 6 can be inexpensively made from a length of cylindrical metal tubing and is intended especially for use in making high buoyancy floats of cellular ebonite for use in liferafts, buoys and the like. The interior of the mold can be given a slight taper or "draft" for easy removal of the finished rigid product if the shrinkage of the material on cooling after vulcanization does not make it sufficiently easy to remove.

As an alternative to the procedure above described an outer layer of foam, adjacent the mold and/or core, can be irreversibly coagulated by forming the foam of a heat-sensitive dispersion of rubber and quickly heating the mold assembly to such high temperature but for so short a time that only the layer of foam adjacent the metal member reaches so high a temperature as to be irreversibly coagulated, the rest of the foam then being caused to collapse by maintaining it at a temperature less than the coagulating temperature for a sufficient time.

Suitable heat-sensitive dispersions are well known to those skilled in the art, examples being disclosed, for example, in U. S. Patents Nos. 1,717,248; 1,750,540; 1,811,695; and 1,816,764.

Further modifications are possible without departure from the scope of the invention as defined in the appended claims.

I claim:

1. A method of producing an article formed with a cavity which comprises subjecting a contoured surface of a mass of foamed dispersion of rubber to a change of temperature of such degree and duration that it stabilizes against collapse a layer of the foam adjacent to the said contoured surface and leaves unstabilized the rest of the foam, the face of said layer adjacent the unstabilized part of the foam having a shape approximating that of the said contoured surface, and effecting collapse of the unstabilized part of the foam to provide the cavity while the said layer continues to be in stabilized condition.

2. A method as defined in claim 1 in which the stabilization of the recited layer of the foam is effected from all sides of of the mass, so that the cavity resulting from the collapse of the underlying foam is a closed cavity.

3. A method as defined in claim 1 in which the stabilization of the recited layer is effected by subjecting to change of temperature a mold containing the foam.

4. A method as defined in claim 1 in which the change of temperature is effected in part through a heat-conductive mold core, whereby a cavity is formed in the mass by said core and the shape of the cavity formed by collapse of foam is determined in part by the presence and the heat-conducting effect of the core.

5. A method as defined in claim 1 in which a determinately arranged set of heat-conductive mold cores are employed for effecting quick change of temperature of parts of the foam adjacent to the cores, the collapsing part of the foam being given, by the presence and the heat-conducting effect of the cores, a determinate geometrical pattern in determinate relation to the cavities molded in the article by the cores.

6. A method as defined in claim 1 in which a fluid is passed through the cavity formed by collapse of foam, for treatment, with the fluid of the stabilized layer of foam.

7. A method as defined in claim 1 in which the foam is formed of a dispersion of rubber adapted to be stabilized by heat and in which the recited layer is stabilized by heating it.

8. A method as defined in claim 1 in which the stabilizing of the recited layer is effected by freezing it.

JOSEPH ANTON TALALAY.

REFERENCES CITED

The following references are of record in the file of this patent:

UNITED STATES PATENTS

| Number | Name | Date |
|---|---|---|
| 1,409,059 | Miller | Mar. 7, 1922 |
| 1,956,156 | Madge | Apr. 2, 1934 |
| 2,167,215 | Leary | July 25, 1939 |
| 2,180,304 | Minor | Nov. 14, 1939 |
| 2,309,005 | Ogilby | Jan. 19, 1943 |
| 2,358,962 | Cunningham | Sept. 26, 1944 |
| 2,432,353 | Talalay | Dec. 9, 1947 |
| 2,434,035 | DeLaney | Jan. 6, 1948 |